April 12, 1949.  W. B. OSBORNE  2,467,220
SPEED VARYING GEARING

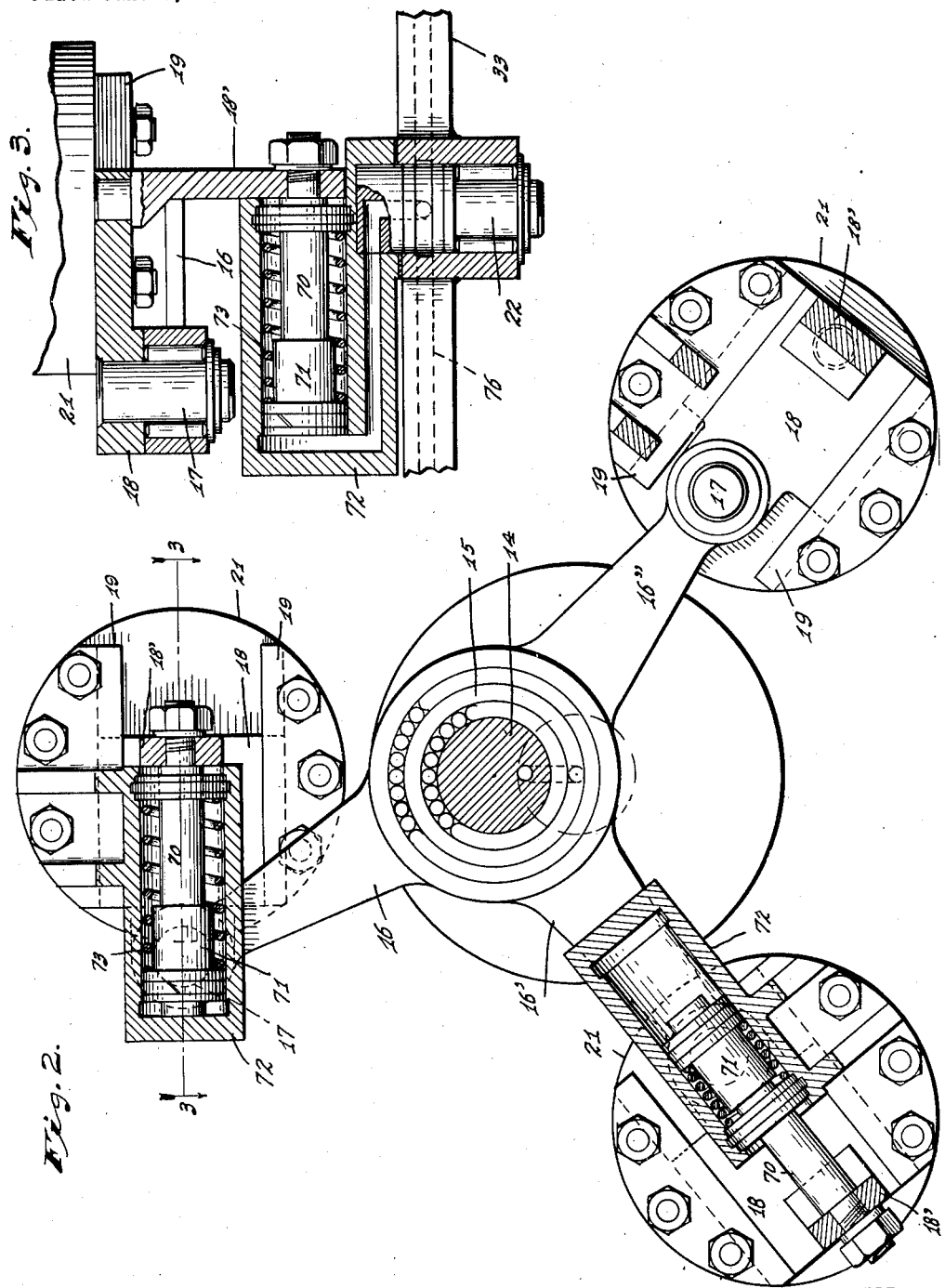

Filed Jan. 5, 1944.  4 Sheets-Sheet 3

INVENTOR.
WILLIAM B. OSBORNE,
BY Hood & Hahn
ATTORNEYS.

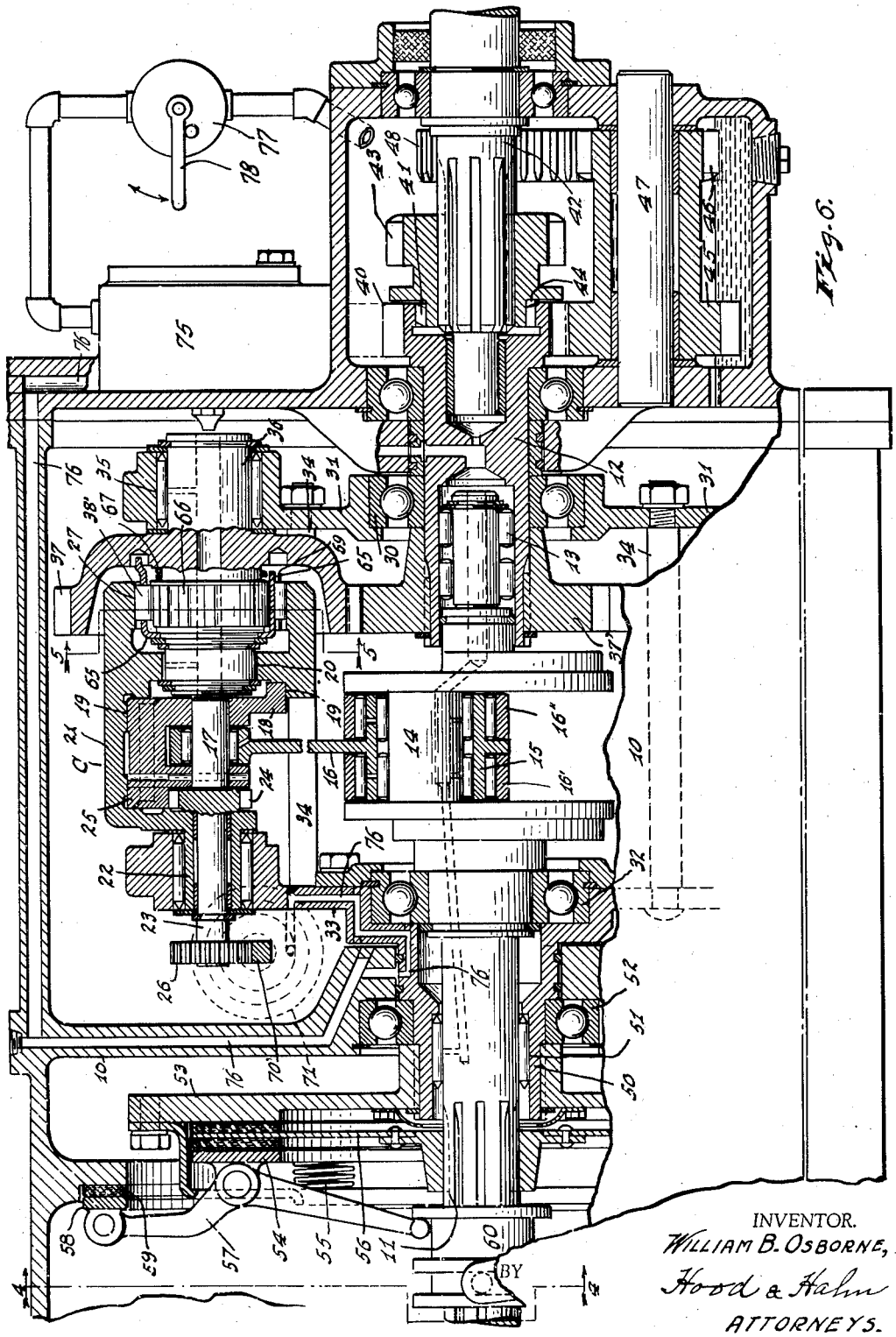

Patented Apr. 12, 1949

2,467,220

UNITED STATES PATENT OFFICE 2,467,220

SPEED VARYING GEARING

William B. Osborne, Muncie, Ind.

Application January 5, 1944, Serial No. 517,021

9 Claims. (Cl. 74—119)

The object of my invention is to provide a variable-speed transmission unit characterized by variable-lever ratchet mechanism.

The accompanying drawings illustrate my invention.

Fig. 2 is a section on line 2—2 of Fig. 1 with one ratchet lever in minimum position and one ratchet lever in maximum position;

Fig. 3 is a section on line 3—3 of Fig. 2;

Fig. 6 is a section similar to Fig. 1 of another embodiment of my invention.

Figure 1:
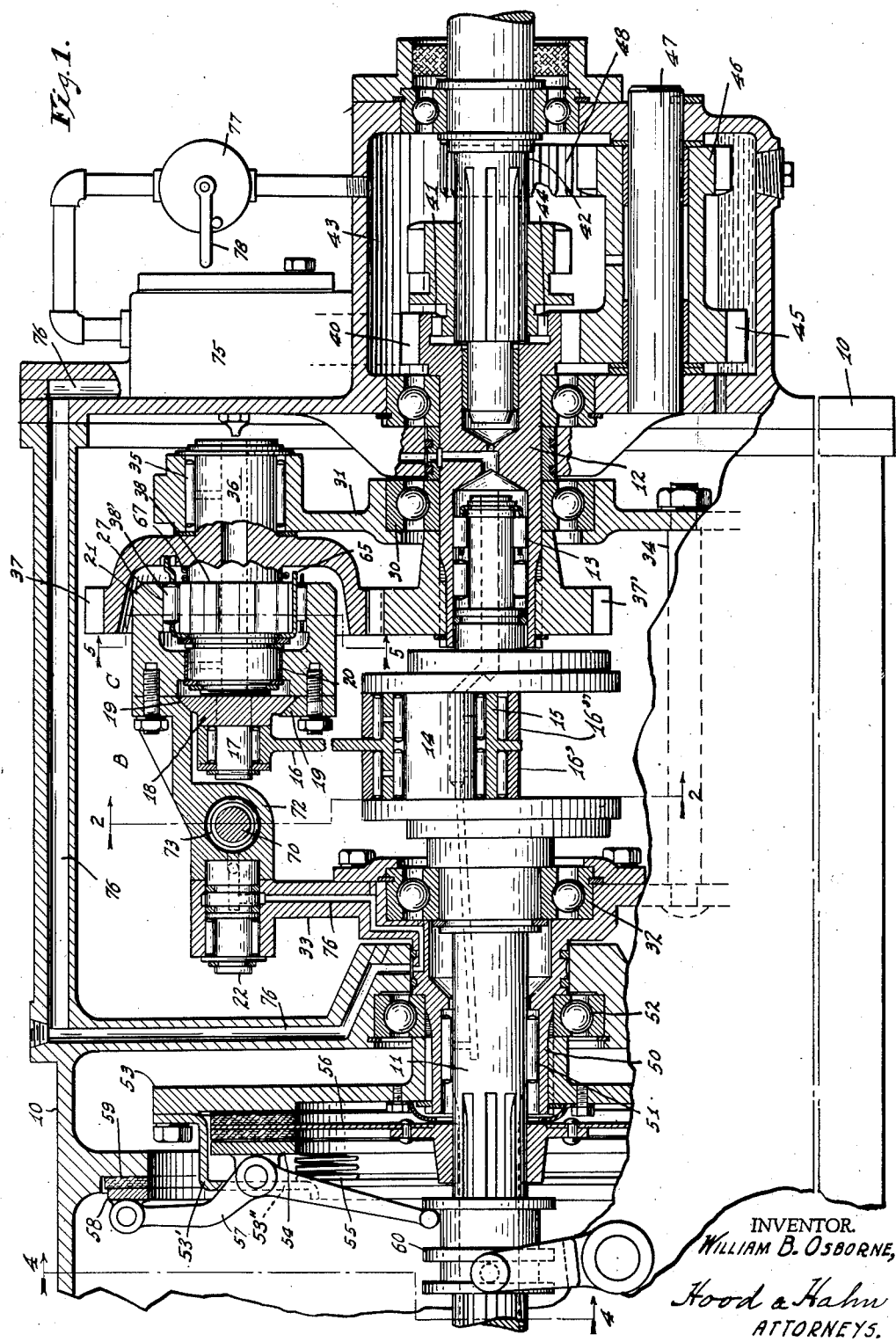
Fig. 1 is a fragmentary axial section of one embodiment of my invention.
Figure 4:
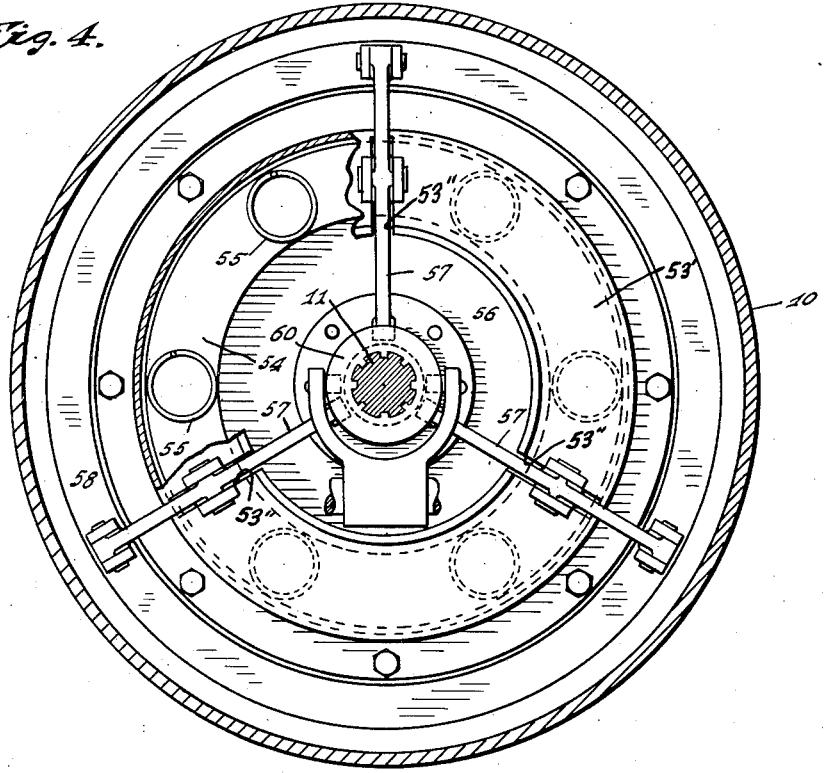
Fig. 4 is a section on line 4—4 of Figs. 1 and 6.

Journalled in the casing 10 is the input shaft 11 and the aligned output shaft 12, the inner end of the input shaft 11 being projected into and journalled in the inner end of output shaft 12 with an interposed one-way clutch 13 permitting forward motion of shaft 11 relative to shaft 12 and preventing forward motion of shaft 12 relative to shaft 11.

Shaft 11 is provided with a crank or wrist pin 14 upon which is journalled the hub 15 of a pitman rod 16. Journalled on the hub 15 of rod 16, and consequently journalled upon wrist pin 14, are two pitman rods 16' and 16''. The outer end of pitman rod 16 is journalled upon a pin 17 carried by a lever 18 slidable in ways 19 formed transversely of the bore 20 of a ratchet block 21 to which is attached a bracket B carrying a trunnion pin 22 coaxial with bore 20.

The end of block 21, opposite pin 22 and outwardly beyond bore 20, is bored at 27.

Journalled on bearings 30 on the output shaft 12 is a disc 31, and journalled on bearings 32 on input shaft 11 is a disc 33. The two discs are connected to form a unitary structure, hereinafter referred to as cage C, by appropriate bolts 34.

Disc 31 is provided with three journal bearings 35—35—35 in each of which is journalled one end of a shaft 36 the opposite end being journalled in bearing 20. Shaft 36 carries a gear 37 and interposed between the shaft 36 and the bore 27 of block 19 is a one-way clutch or ratchet 38.

The delivery end of output shaft 12 is provided with a gear 40 and a coaxial jaw clutch 41. Coaxial with the output shaft 12 is a tail shaft 42 upon which is splined a gear 43 and unitary clutch 44 adapted to mate with clutch 41. Gear 40 meshes with a gear 45 which is associated with a gear 46 on jack shaft 47, gear 46 meshing with a gear 48 meshable by gear 43 for reverse.

Disc 33 of cage C is provided with a tubular hub 50 sleeved upon input shaft 11 with an intermediate bearing 51 and supported in bearing 52 in casing 10. Keyed to sleeve 50 is a clutch disc 53 with which is associated a clamping ring 54 which is urged toward disc 53 by a plurality of circumferentially spaced springs 55.

Interposed between disc 53 and ring 54 is a clutch disc 56 which is splined upon input shaft 11.

Pivoted upon ring 54 at circumferentially spaced points are several (conveniently 3) levers 57, the outer ends of which are pivoted upon a clamping ring 58 adapted to engage annular friction surface 59 on casing 10. The inner ends of levers 57 are engaged by a shift collar 60 slidable on input shaft 11 and adapted to be positioned by any well known form of manual control (not shown).

Fixed to a disc 53 is a shell 53' formed with several (conveniently three) slots 53'' in which the levers 57 engage to provide a driving connection between said shell 53' (and consequently the disc 53) and said levers 57 (and consequently the disc 54 and the ring 58). The disc 54, ring 58, and levers 57 are radially supported by the collar 60, upon which the near ends of said levers float.

When collar 60 is moved to the position shown in Fig. 1, levers 57 clamp ring 58 upon friction surface 59 and also retract ring 54 from the clutch disc 56 thereby holding discs 54 and 53, and consequently cage C, against rotation. When collar 60 is released, springs 55 will move ring 54 to the right so as to clamp clutch disc 56 and disc 53 together, simultaneously releasing ring 58 from casing 10, thereby directly connecting input shaft 11 and cage C.

Figure 5:
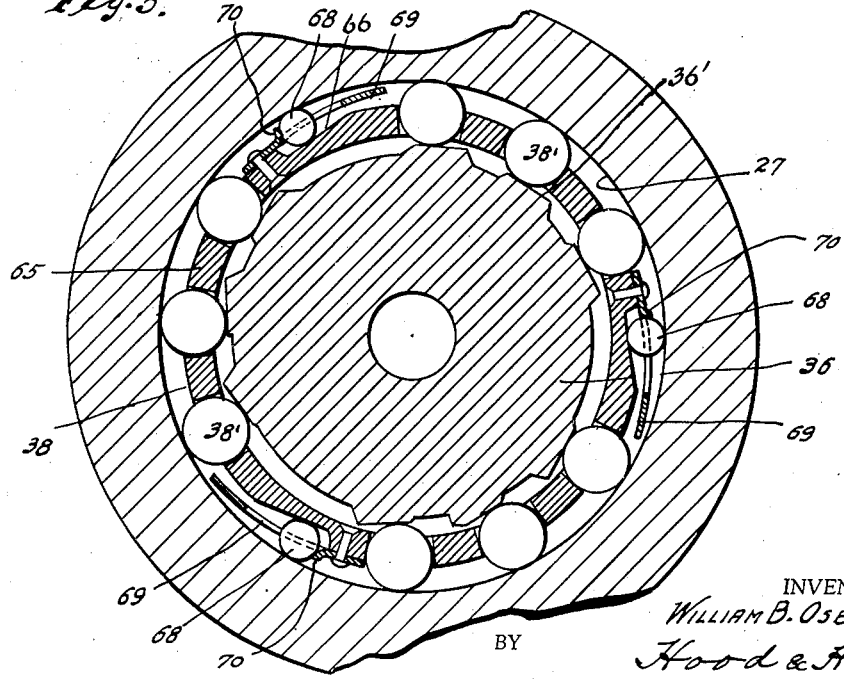
Fig. 5 is a section, on a larger scale, on line 5—5 of Figs. 1 and 6.

It is desirable that the takeup slack of the one-way clutch 38 be reduced to a minimum and for that reason, I recommend the construction shown in Fig. 5. The clutch rollers 38' are spaced by a cage 65 and they coact with bore 27 and cam faces 36' on shaft 36 in a well known manner, the cage being yieldingly urged toward the active or clutching position by spring 67 anchored on gear 37.

As an insurance of quick action of this clutch, I provide cage 65 externally with a plurality of cam faces 66 between each of which and bore 27 is inserted a supplemental clutch roller 68 which is yieldingly urged toward active position by a spring 69 which is provided, near its root, with an upwardly turned finger 70 which overlies and engages roller 68 to urge it to active position.

Each of the pitmen 16' and 16'' is connected to ratchet mechanism like that which has just been described and as input shaft 11 is rotated, the several pitmen, in succession, will oscillate ratchet blocks 21 and cause them, through the medium of their one-way clutches 38, to propel the gears 37 forwardly and thus propel output shaft 12 forwardly. The propelling action of each pitman will occur during a one-half rotation of the input shaft with a maximum effect at an intermediate point in the 180° arc. As to each ratchet mechanism, there will be a period of 180° in each rotation of the input shaft when that ratchet mechanism is wholly free from the load of the output shaft and, during this period, it is possible to adjust the effective length of lever 18 and thereby adjust the speed ratio of the gearing while the apparatus, considered as a whole, is under load.

For this purpose each lever 18, at its outer end, carries a laterally projected arm 18' to which is secured a piston 71 slidable in cylinder 72 formed in bracket B, the preferred arrangement being such that the axis of cylinder 72 intersects the axis of ratchet block 21 and parallel with ways 19. Piston 71 is biased in one direction by spring 73 to normally urge lever 18 to place pin 17 at its maximum distance from the axis of ratchet block 21.

The position of each piston 71, against the bias of its spring 73 is determined by the volume of oil in the outer end of the associate cylinder 72, said oil being obtained from an oil pump 75 through a duct 76 leading from the pump through casing 19, sleeve 50, disc 33, pin 22, and bracket B to cylinder 72, as clearly shown in Figs. 1 and 6. The volumes of oil in cylinders 72 will be dependent upon the current maximum pressure maintained in ducts 76, assuming adequate capacity of pump 75, and control of this pressure is obtained by means of an adjustable maximum pressure relief valve 77 of well known form which, in the drawings, is indicated as one which is manually controllable by lever 78. The low pressure adjusted position of this valve will be such that springs 73 will be capable of urging their pistons 71 to their normal positions where the effective leverages of levers 18 on their ratchet blocks 21 will be maximum and consequently their angular effects on their respective ratchet blocks due to reciprocation of the pitman rods 16, 16' and 16'' will be minimum.

The operation is as follows:

Relief valve 77 being in low pressure condition, lever 18 in longest leverage position, and clutch 58—59 activated to hold cage C against rotation, application of power to input shaft 11 will cause reciprocation of pitman rods 16, 16', 16'' to apply forwardly rotating driving forces, in circumferential succession, upon the several gears 37 to thereby rotate output shaft 12. The several rachet mechanisms will thus be subjected to load torque in succession during part of each rotation of the input shaft and each of the said ratcheting mechanisms will be free from load torque during part of each rotation of the input shaft.

As load torque decreases relative to input torque effective pressure in duct 76 may be increased to cause the pistons 71 to successively move inwardly each during a period when its ratchet mechanism is not subject to load torque, thereby shortening the effective lever arm of slide block 18 and consequently increasing the angular movement of the ratchet rod per unit of angular movement of the wrist pin 14 of the input shaft.

The highest speed of output shaft 12 attainable through the medium of the ratchet mechanism will approximate the speed of the input shaft and the operator may, at this time, release levers 57 thereby releasing brake 58—59 to permit rotation of cage C and connecting cage C directly to the input shaft through the medium of clutch 53—54—56.

In the form of my invention shown in Fig. 1, forces applied by the pitmen on the slidable lever 18 will have slight components parallel to guide 19 but, by attaching cylinders 71 to the ratchet blocks and arranging them in planes radial to the ratchet blocks these components are so reduced as to be ineffective to change the positions of levers 18 transversely of the axes of the ratchet blocks during oscillations of the levers.

Other means for adjusting levers 18 may be provided without departing from my invention.

Referring to Fig. 6 parts similar to parts in the form shown in Fig. 1 are designated by the same reference characters.

In this form ratchet block 21 is provided with a sleeve 22 which is coaxial with the block and is journalled in disc 33 eccentric to the axis of the disc. Cylinders 70 are attached to disc 33, one adjacent each sleeve 22, and each piston 71 is provided with a rack 70' which meshes with a pinion 26 carried by a shaft 23 journalled in a sleeve 22 and provided with a gear 24 which meshes with a rack 25 attached to the adjacent lever 18.

In this form forces applied by the pitmen 16 to levers 18 would probably cause, or tend to cause, reciprocation of pistons 71, and thereby a shifting of levers 18 relative to the axes of the ratchet blocks 21 during each rotation of the input shaft and for that reason the construction shown in Fig. 1 is considered preferable.

I claim as my invention:

1. A speed-variable transmission gearing comprising an input shaft, an output shaft substantially coaxial with said input shaft, a plurality of pitmen each independently eccentrically journalled on the input shaft, and a corresponding plurality of driving connections, one between the outer end of each pitman and the output shaft, each of said driving connections including a one-way clutch, and means by which the relation between each pitman and its associated one-way clutch may be independently varied to vary the stroke of said clutch.

2. A speed-variable transmission gearing comprising an input shaft, an output shaft, a plurality of pitmen each individually eccentrically journalled on the input shaft, and a corresponding plurality of driving connections, one between the outer end of each pitman and the output shaft, each of said driving connections including a one-way clutch, the connection between a pitman and the output shaft comprising a gear journalled on an axis other than the axis of the output shaft, a ratchet block journalled on the axis of said gear, a one-way clutch between said ratchet block and said gear, a lever mounted on said ratchet block and adjustable transversely of the axis thereof, a connection between said lever and a pitman eccentric to the axis of the ratchet block, and means by which said lever may be independently shifted to vary its effective length and held in different positions of adjustment.

3. Apparatus of the character specified in claim 2 wherein said lever shifting means comprises a rack carried by said lever lengthwise thereof, a pinion meshing with said rack and coaxial with said ratchet block, a second rack arranged to rotate on said pinion, a cylinder and piston structure acting on said second rack and normally biased in one direction, and a controllable source of fluid pressure for said cylinder and piston structure in opposition to said bias.

4. In a speed-varying unit, an input shaft having a crank, an output shaft coaxial with the input shaft, a cage coaxial with said shafts, a gear carried by the output shaft, a gear carried by the cage for orbital movement about the axis of said output shaft and meshing with the gear of the output shaft, an oscillable block coaxial with said last-named gear, a one-way clutch interposed between said block and said last-named gear, a lever associated with said block and slidable transversely of the axis of the block, a pitman independently journalled on the crank of the input shaft and pivotally associated with said lever, a cylinder carried by the cage, a piston in said cylinder, means biasing said piston to one extreme in said cylinder, a source of fluid pressure connected to said cylinder in opposition to the bias on the piston, means for controlling the application of said fluid pressure to said piston, and a connection between said piston and lever to position said lever relative to its block in accordance with piston position.

5. A ratchet mechanism comprising a rotatable driven member, a coaxial driving member, one-way clutching means interposed between said driving and driven members, a lever mounted on said driving member for sliding movement transversely of the axis of the driving member, a piston-and-cylinder structure one element of which is carried by said driving member and the other element of which is connected to said lever, and means for adjusting the relation between the two elements of said piston-and-cylinder structure to vary the effective leverage of said lever relative to said driving member.

6. A ratchet mechanism comprising a rotatable driven member, a coaxial driving member, one-way clutching means interposed between said driving and driven members, a lever mounted on said driving member for sliding movement transversely of the axis of the driving member, a piston-and-cylinder structure one element of which is connected to said lever to shift the same transversely of the axis of said driving member, and means for adjusting the relation between the two elements of said piston-and-cylinder structure to vary the effective leverage of said lever relative to said driving member.

7. A speed variable transmission comprising coaxial input and output shafts, a gear carried by said output shaft, a gear meshing with the gear of the output shaft, a rotatable carrier for said last-named gear coaxial with the input and output shafts, a ratchet block coaxial with said last-named gear, a lever mounted on said ratchet block and shiftable transversely of the axis of the block, a driving connection between the input shaft and said lever whereby rotation of the input shaft will cause oscillation of the ratchet block, one-way clutching means interposed between said last-named gear and said ratchet block, means for selectively coupling said carrier with the input shaft or holding said carrier against rotation, and means for selectively determining the position of said lever on the ratchet block.

8. A speed variable transmission comprising an input shaft, an output shaft coaxial therewith and carrying a gear, a gear meshing with said output shaft gear, a rotatable carrier for said last-named gear coaxial with the input and output shafts, a ratchet block coaxial with said last-named gear, one-way clutching means interposed between said last-named gear and said ratchet block, a lever slidable on the ratchet block transversely of the axis of the block to vary the effective length of said lever, a pitman eccentrically connected to the input shaft and pivotally connected with said lever, a cylinder carried by the ratchet block with its axis parallel with the sliding movement of said lever, a piston mounted in said cylinder and connected with said lever, means biasing said piston in said cylinder in one direction, controllable fluid pressure means connected to said cylinder in opposition to said biasing means, and means for selectively holding said carrier against rotation or coupling said carrier with the input shaft.

9. In a speed-varying unit, an input shaft having a crank, an output shaft coaxial with the input shaft, a cage coaxial with said shafts, a gear carried by the output shaft, a gear carried by the cage for orbital movement about the axis of said output shaft and meshing with the gear of the output shaft, an oscillable block coaxial with said last-named gear, a one-way clutch interposed between said block and said last-named gear, a lever associated with said block and slidable transversely of the axis of the block, a pitman independently journalled on the crank of the input shaft and pivotally associated with said lever, and means for adjusting said lever relative to said block.

WILLIAM B. OSBORNE.

REFERENCES CITED

The following references are of record in the file of this patent:

UNITED STATES PATENTS

| Number | Name | Date |
|---|---|---|
| 1,943,396 | Quevrain et al. | Jan. 16, 1934 |
| 1,982,670 | Johnson | Dec. 4, 1934 |
| 2,023,579 | Dodge | Dec. 10, 1935 |
| 2,047,792 | McFarlane | July 14, 1936 |
| 2,175,876 | Chilton | Oct. 10, 1939 |
| 2,226,940 | Meyer et al. | Dec. 31, 1940 |
| 2,319,485 | Alabrume | May 18, 1943 |
| 2,417,944 | Osborne | Mar. 25, 1947 |

FOREIGN PATENTS

| Number | Country | Date |
|---|---|---|
| 386,308 | France | Aug. 10, 1908 |